United States Patent
Yamaki et al.

(10) Patent No.: US 11,742,507 B2
(45) Date of Patent: Aug. 29, 2023

(54) POLYMER ELECTROLYTE MEMBRANE, MEMBRANE ELECTRODE ASSEMBLY AND WATER ELECTROLYZER

(71) Applicant: AGC Inc., Chiyoda-ku (JP)

(72) Inventors: Yasushi Yamaki, Chiyoda-ku (JP);
Kosuke Sumikura, Chiyoda-ku (JP);
Takuo Nishio, Chiyoda-ku (JP);
Takumi Okuyama, Chiyoda-ku (JP);
Satoru Hommura, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 629 days.

(21) Appl. No.: 16/861,271

(22) Filed: Apr. 29, 2020

(65) Prior Publication Data
US 2020/0259196 A1    Aug. 13, 2020

Related U.S. Application Data

(63) Continuation of application No. PCT/JP2018/041164, filed on Nov. 6, 2018.

(30) Foreign Application Priority Data

Nov. 6, 2017    (JP) ................................ 2017-213865

(51) Int. Cl.
| | | |
|---|---|---|
| *H01M 4/02* | (2006.01) | |
| *H01M 8/1039* | (2016.01) | |
| *C02F 1/461* | (2023.01) | |
| *C25B 13/08* | (2006.01) | |
| *C25B 1/04* | (2021.01) | |
| *H01M 8/10* | (2016.01) | |

(Continued)

(52) U.S. Cl.
CPC ....... *H01M 8/1039* (2013.01); *C02F 1/46104* (2013.01); *C25B 1/04* (2013.01); *C25B 13/08* (2013.01); *H01M 8/10* (2013.01); *H01M 8/1004* (2013.01); *H01M 8/1018* (2013.01); *H01M 2300/0082* (2013.01)

(58) Field of Classification Search
CPC ....................................................... H01M 4/02
See application file for complete search history.

(56) References Cited

U.S. PATENT DOCUMENTS

| | | | |
|---|---|---|---|
| 2009/0104476 A1* | 4/2009 | Ji ........................... | H01M 8/023 |
| | | | 429/514 |
| 2011/0027688 A1 | 2/2011 | Hommura et al. | |
| 2015/0270567 A1* | 9/2015 | Tanuma .............. | H01M 8/1004 |
| | | | 252/511 |

FOREIGN PATENT DOCUMENTS

| | | | |
|---|---|---|---|
| JP | 59-172524 A | 9/1984 | |
| JP | 03-217427 A | 9/1991 | |

(Continued)

OTHER PUBLICATIONS

International Search Report dated Feb. 12, 2019 in PCT/JP2018/041164 filed on Nov. 6, 2018, 2 pages.

*Primary Examiner* — Jacob B Marks

(74) *Attorney, Agent, or Firm* — Oblon, McClelland, Maier & Neustadt, L.L.P.

(57) ABSTRACT

The present invention provides a strong polymer electrolyte membrane which can provide a water electrolyzer operable at low electrolysis voltage. The polymer electrolyte membrane of the present invention comprises a fluorinated polymer and a woven fabric, wherein the weight of the woven fabric is from 20 to 95 g/m², and the warp and weft of the woven fabric independently have a denier of from 30 to 100.

16 Claims, 1 Drawing Sheet

(51) Int. Cl.
*H01M 8/1004* (2016.01)
*H01M 8/1018* (2016.01)

(56) References Cited

FOREIGN PATENT DOCUMENTS

| | | | |
|---|---|---|---|
| JP | 06-029032 | A | 2/1994 |
| JP | 06-231780 | A | 8/1994 |
| JP | 11-049877 | * | 2/1999 |
| JP | 11- 049877 | A | 2/1999 |
| JP | 11-67246 | A | 3/1999 |
| JP | 2000-260443 | A | 9/2000 |
| WO | WO 2011/013578 | A1 | 2/2011 |

* cited by examiner

POLYMER ELECTROLYTE MEMBRANE, MEMBRANE ELECTRODE ASSEMBLY AND WATER ELECTROLYZER

TECHNICAL FIELD

The present invention relates to a polymer electrolyte membrane, a membrane/electrode assembly and a water electrolyzer using them.

BACKGROUND ART

Polymer electrolyte membranes have various applications and have been studied extensively.

For example, polymer electrolyte membranes are used in water electrolyzers (such as PEM water electrolyzers and alkaline water electrolyzers) (Patent Document 1).

PRIOR ART DOCUMENTS

Patent Documents

Patent Document 1: JP-A-H06-29032

DISCLOSURE OF INVENTION

Technical Problem

In water electrolyzers, polymer membranes as the partition between the anode compartment and the cathode compartment are under high pressure. Therefore, polymer electrolyte membranes need high strength. However, polymer electrolyte membranes with high strength conventionally have high electrical resistance and hence result in high electrolysis voltage. Meanwhile, water electrolyzers using polymer electrolyte membranes are required to operate at as low an electrolysis voltage as possible, and polymer electrolyte membranes having as low an electrical resistance are demanded.

In view of the above-mentioned circumstances, the present invention aims to provide a polymer electrolyte membrane suitable for water electrolysis which has high strength and can provide a water electrolyzer operable at a lower electrolysis voltage when used in the water electrolyzer.

The present invention also aims to provide a membrane/electrode assembly and a water electrolyzer.

Solution to Problem

As a result of their extensive studies on the above-mentioned problem, the present inventors have found that the desired effect can be obtained by adjusting the properties of a woven fabric in a polymer electrolyte membrane, and have accomplished the present invention.

The present invention has the following aspects.
(1) A polymer electrolyte membrane comprising a fluorinated polymer and a woven fabric, wherein the weight of the woven fabric is from 20 to 95 g/m$^2$, and the warp and weft of the woven fabric independently have a denier of from 30 to 100.
(2) The polymer electrolyte membrane according to (1), wherein the ion exchange capacity of the fluorinated polymer is from 1.00 to 2.00 meq/g dry resin.
(3) The polymer electrolyte membrane according to (1) or (2), wherein the warp density and the weft density of the woven fabric are independently at least 20 threads/in. and at most 100 threads/in.
(4) The polymer electrolyte membrane according to any one of (1) to (3), wherein the woven fabric is a plain weave.
(5) The polymer electrolyte membrane according to any one of (1) to (4), which is from 30 to 500 µm in thickness.
(6) The polymer electrolyte membrane according to any one of (1) to (5), wherein the warp and weft are made of a material selected from the group consisting of polytetrafluoroethylene, polyether ether ketone and polyphenylene sulfide.
(7) The polymer electrolyte membrane according to (6), wherein the warp and the weft are slit yarns.
(8) The polymer electrolyte membrane according to any one of (1) to (7), wherein the ion exchange groups are sulfonic acid functional groups.
(9) The polymer electrolyte membrane according to any one of (1) to (8), wherein the fluorinated polymer comprises units based on a fluoroolefin and units based on a monomer having a sulfonic acid functional group and a fluorine atom.
(10) The polymer electrolyte membrane according to (9), wherein the units based on a fluoroolefin are units based on tetrafluoroethylene.
(11) The polymer electrolyte membrane according to (9) or (10), wherein the units based on a monomer having a sulfonic acid functional group and a fluorine atom are units represented by the formula (1), which will be mentioned later.
(12) The polymer electrolyte membrane according to (11), wherein the units represented by the formula (1) are units represented by the formula (1-3), which will be mentioned later.
(13) The polymer electrolyte membrane according to (11), wherein the units represented by the formula (1) are units represented by the formula (1-4), which will be mentioned later.
(14) A membrane/electrode assembly comprising an anode having a catalyst layer, a cathode having a catalyst layer, and the polymer electrolyte membrane as defined in any one of (1) to (13) disposed between the anode and the cathode.
(15) A water electrolyzer comprising the polymer electrolyte membrane as defined in any one of (1) to (13) or the membrane/electrode assembly as defined in (14).

Advantageous Effects of Invention

The present invention provides a strong polymer electrolyte membrane which can provide a water electrolyzer operable at low electrolysis voltage.

The present invention also provides a membrane/electrode assembly and a water electrolyzer.

DESCRIPTION OF EMBODIMENTS

The following definitions of terms apply throughout the specification including claims, unless otherwise noted.

An "ion exchange group" is such a group containing an ion which can be exchanged with another ion, and the following carboxylic acid functional group, sulfonic acid functional group, etc. may be mentioned. The ions in all the ion exchange groups in the polymer electrolyte membrane may be exchanged with other ions, or the ions in only some of the ion exchange groups in the polymer electrolyte membrane may be exchanged with other ions.

A "sulfonic acid functional group" means a sulfonic acid group (—SO$_3$H) or a sulfonate group (—SO$_3$M$^2$, where M$^2$ is an alkali metal or a quaternary ammonium cation).

A "carboxylic acid functional group" means a carboxylic acid group (—COOH) or a carboxylate group (—COOM$^1$ where M$^1$ is an alkali metal or a quaternary ammonium cation).

A "precursor membrane" is a membrane comprising a polymer having groups convertible to ion exchange groups.

A "group convertible to an ion exchange group" means a group which can be converted to an ion exchange group by treatments such as hydrolysis and conversion to an acid form.

A "group convertible to a sulfonic acid functional group" means a group which can be converted to a sulfonic acid functional group by treatments such as hydrolysis and conversion to an acid form.

A "group convertible to a carboxylic acid functional group" means a group which can be converted to a carboxylic acid functional group by known treatments such as hydrolysis and conversion to an acid form.

A "perfluorinated hydrocarbon group" means a hydrocarbon group in which all the hydrogen atoms have been replaced by fluorine atoms.

A "unit" in a polymer mean an atomic group derived from 1 molecule of a monomer by polymerization. A unit may be an atomic group directly formed by a polymerization reaction, or may be an atomic group having a partially different structure obtained by polymerization followed by partial structural conversion.

A numerical range expressed by using "to" includes the figures before and after "to" as the lower limit and the upper limit.

[Polymer Electrolyte Membrane]

The polymer electrolyte membrane of the present invention comprises a fluorinated polymer having ion exchange groups (hereinafter referred to also as fluorinated polymer (I)) and a woven fabric wherein the weight of the woven fabric is from 20 to 95 g/m$^2$, and the warp and weft of the woven fabric independently have a denier of from 30 to 100.

One of the features of the polymer electrolyte membrane of the present invention is inclusion of a woven fabric having a particular structure. The use of a woven fabric having a particular structure is supposed to make the polymer electrolyte membrane strong and decrease the electrolysis voltage of a water electrolyzer.

Figure 1:
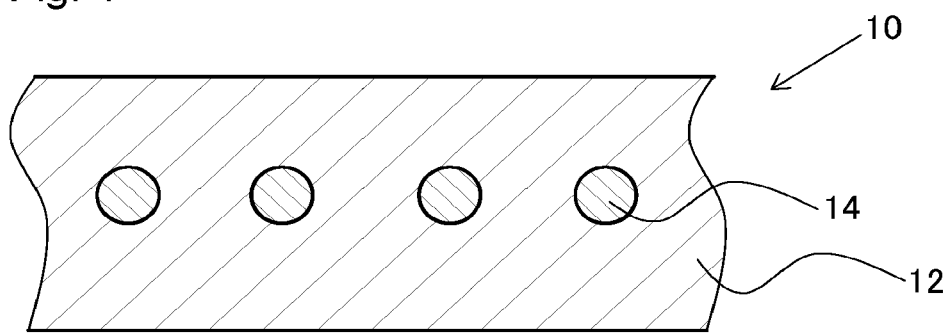
FIG. 1 A schematic sectional view of an embodiment of the polymer electrolyte membrane of the present invention.

FIG. 1 is a schematic sectional view of an embodiment of the polymer electrolyte membrane of the present invention.

The polymer electrolyte membrane 10 comprises an electrolyte 12 comprising a fluorinated polymer (I) and a woven fabric 14 embedded in the electrolyte 12.

The thickness of the polymer electrolyte membrane is preferably at least 30 μm, more preferably at least 40 μm in view of the strength of the polymer electrolyte membrane and is preferably at most 500 μm, more preferably at most 300 μm in order to provide a water electrolyzer with a lower electrolysis voltage.

Now, the respective components will be described in detail. First, the woven fabric 14 will be described.

[Woven Fabric]

The weight of the woven fabric is from 20 to 95 g/m$^2$. It is preferably at least 25 g/m$^2$, more preferably at least 35 g/m$^2$, and preferably at most 80 g/m$^2$, more preferably at most 50 g/m$^2$, to make the polymer electrolyte membrane even stronger and to provide a water electrolyzer with a lower electrolysis voltage.

The warp and weft of the woven fabric independently have a denier of from 30 to 100, preferably at least 40 and at most 80, more preferably at most 70, to attain an even lower electrolysis voltage.

Denier is the mass (g/9,000 m) in grams per 9,000 m of yarn.

The warp density and the weft density are preferably at least 20 threads/in., more preferably at least 50 threads/in., and preferably at most 100 threads/in., more preferably at most 90 threads/in. to attain a lower electrolysis voltage and make the polymer electrolyte membrane stronger.

The warp threads and the weft threads may be monofilaments each composed of a single filament or multifilaments each composed of two or more filaments, and are preferably monofilaments.

The warp and the weft are preferably made of a material selected from the group consisting of polytetrafluoroethylene (hereinafter referred to also as "PTFE"), polyether ether ketone and polyphenylene sulfide in view of durability of the threads.

The warp and the weft are preferably slit yarns in view of durability and strength of the threads.

The woven fabric may be a plain weave, a twill weave or a satin weave and is preferably a plain weave. The woven fabric is preferably made of warp threads and weft threads orthogonally woven.

The electrolyte comprises a fluorinated polymer (I).

The ion exchange capacity of the fluorinated polymer (I) is preferably at least 0.90 meq/g dry resin in order to provide a water electolyzer with a lower electrolysis voltage. Hereinafter, "meq/g dry resin" will sometimes be omitted. The ion exchange capacity is preferably at least 1.00, more preferably at least 1.20, and is preferably at most 2.00, more preferably at most 1.90 to make the polymer electrolyte membrane even stronger.

The fluorinated polymer (I) to be used in the polymer electrolyte membrane may be a single species or a mixture or laminate of two or more species.

Though the polymer electrolyte membrane may contain a polymer other than the fluorinated polymer (I), it is preferred to practically consist of the fluorinated polymer (I). Practically consist of the fluorinated polymer (I) means that the content of the fluorinated polymer (I) is at least 95 mass % of the total mass of the polymers in the polymer electrolyte membrane. The upper limit of the content of the fluorinated polymer (I) is 100 mass % relative to the total mass of the polymers in the polymer electrolyte membrane.

As specific examples of the polymers other than the fluorinated polymer (I), polyazole compounds selected from the group consisting of polymers of heterocyclic compounds containing at least one ring-constituting nitrogen atom and polymers of heterocyclic compounds containing at least one ring-constituting nitrogen atom and at least one ring-constituting oxygen and/or sulfur atom.

Specific examples of the polyazole compounds include polyimidazoles, polybenzimidazoles, polybenzobisimidazoles, polybenzoxazoles, polyoxazoles, polythiazoles, polybenzothiazoles and the like.

In view of the oxidation resistance of the polymer electrolyte membrane, the other polymer may be a polyphenylene sulfide resin or a polyphenylene ether resin.

The fluorinated polymer (I) has ion exchange groups. The ion exchange groups may be, for example, sulfonic acid functional groups or carboxylic acid functional groups, and are preferably sulfonic acid functional groups to attain a lower electrolysis voltage.

Hereinafter, a fluorinated polymer having sulfonic acid functional groups (hereinafter referred to also as a fluorinated polymer (S)) will be discussed mainly.

The fluorinated polymer (S) preferably comprises units based on a fluoroolefin and units based on a fluorine-containing monomer having a sulfonic acid functional group.

The fluoroolefin may, for example, be a $C_{2-3}$ fluoroolefin having at least one fluorine atom in the molecule. Specific examples of the fluoroolefin include tetrafluoroethylene (hereinafter referred to also as TFE), chlorotrifluoroethylene, vinylidene fluoride, vinyl fluoride and hexafluoropropylene. Among them, TFE is preferred in view of the production cost of the monomer, the reactivity with other monomers and the ability to give an excellent fluorinated polymer (S).

The fluoroolefin may be a single species or a combination of two or more species.

The units based on a fluorine-containing monomer having a sulfonic acid functional group are preferably units represented by the formula (1).

$$—[CF_2—CF(-L-(SO_3M)_n)]—$$  Formula (1)

L is a (n+1)-valent perfluorinated hydrocarbon group which may contain an oxygen atom.

The oxygen atom may be located at the end of the perfluorinated hydrocarbon group or between carbon atoms.

The number of carbon atoms in the (n+1)-valent perfluorinated hydrocarbon group is preferably at least 1, more preferably at least 2 and is preferably at most 20, more preferably at most 10.

L is preferably a (n+1)-valent perfluorinated aliphatic hydrocarbon group which may contain an oxygen atom, more preferably a divalent perfluoroalkylene group which may contain an oxygen atom when n=1 or a trivalent perfluoroalkylene group which may contain an oxygen atom when n=2. The divalent perfluoroalkylene group may be linear or branched.

M is a hydrogen atom, an alkali metal or a quaternary ammonium cation.

n is an integer of 1 or 2.

The units represented by the formula (1) are preferably units represented by the formula (1-1), units represented by the formula (1-2) or units represented by the formula (1-3).

$$—[CF_2—CF(—O—R^{f1}—SO_3M)]—$$  Formula (1-1)

$$—[CF_2—CF(R^{f1}—SO_3M)]—$$  Formula (1-2)

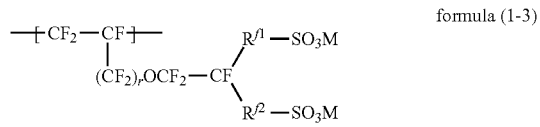
formula (1-3)

$R^{f1}$ is a perfluoroalkylene group which may contain an oxygen atom between carbon atoms. The number of carbon atoms in the perfluoroalkylene group is preferably at least 1, more preferably at least 2, and preferably at most 20, more preferably at most 10.

$R^{f2}$ is a single bond or a perfluoroalkylene group which may contain an oxygen atom between carbon atoms. The number of carbon atoms in the perfluoroalkylene group is preferably at least 1, more preferably at least 2, and preferably at most 20, more preferably at most 10.

r is an integer of 0 or 1.

M is a hydrogen atom, an alkali metal or a quaternary ammonium cation.

The units represented by the formula (1) are more preferably units represented by the formula (1-4).

$$—[CF_2—CF(—(CF_2)_x—(OCF_2CFY)_y—O—(CF_2)_z—SO_3M)]—$$  Formula (1-4)

x is an integer of 0 or 1, y is an integer of from 0 to 2, z is an integer of from 1 to 4, and Y is F or $CF_3$. M is the same as defined above.

Specific examples of units represented by the formula (1-1) include the following units wherein w is an integer of from 1 to 8, x is an integer of from 1 to 5, and M is the same as defined above.

$$—[CF_2—CF(—O—(CF_2)_w—SO_3M)]—$$

$$—[CF_2—CF(—O—CF_2CF(CF_3)—O—(CF_2)_w—SO_3M)]—$$

$$—[CF_2—CF((—O—CF_2CF(CF_3))_x—SO_3M)]—$$

Specific examples of units represented by the formula (1-2) include the following units wherein w is an integer of from 1 to 8, and M is the same as defined above.

$$—[CF_2—CF(—(CF_2)_w—SO_3M)]—$$

$$—[CF_2—CF(—CF_2—O—(CF_2)_w—SO_3M)]—$$

The units represented by the formula (1-3) are preferably units represented by the formula (1-3-1) wherein M is the same as defined above.

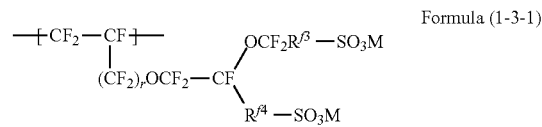
Formula (1-3-1)

$R^{f3}$ is a linear $C_{1-5}$ perfluoroalkylene group, $R^{f4}$ is a single bond or a linear $C_{1-6}$ perfluoroalkylene group which may contain an oxygen atom between carbon atoms. r and M are the same as defined above.

Specific examples of the units represented by the formula (1-3) include the following units.

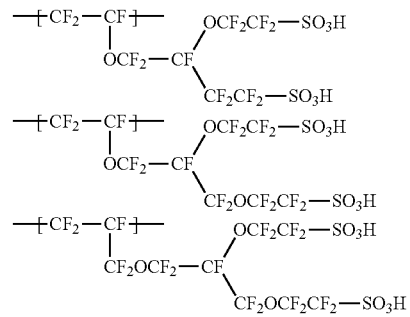

The fluorine-containing monomer having a sulfonic acid functional group may be a single species or a combination of two or more species.

The fluorinated polymer (I) may comprise units based on an additional monomer other than units based on the fluoroolefin and units based on a fluorine-containing monomer having a sulfonic acid functional group.

The additional monomer may, for example, be $CF_2=CFR^{f5}$ (wherein $R^{f5}$ is a $C_{2-10}$ perfluoroalkyl group), $CF_2=CF-OR^{f6}$ (wherein $R^{f6}$ is a $C_{1-10}$ perfluoroalkyl group) or $CF_2=CFO(CF_2)_vCF=CF_2$ (wherein v is an integer of from 1 to 3).

The content of units based on the additional monomer is preferably at most 30 mass % relative to all the units in the fluorinated polymer (I) to secure a certain level of ion exchange performance.

The polymer electrolyte membrane may have a monolayer or a multilayer structure. In the case of a multilayer structure, a laminate of plural layers containing the fluorinated polymer (I) different in ion exchange capacity may be mentioned.

[Production of Ion Exchange Membrane]

The polymer electrolyte membrane of the present invention is produced, preferably by preparing a membrane (hereinafter referred to also as precursor membrane) comprising a fluorinated polymer having groups convertible to ion exchange groups (hereinafter referred to also as fluorinated polymer (I')) and a woven fabric, and then converting the groups convertible to ion exchange groups in the precursor membrane to ion exchange groups.

The woven fabric is described above.

The fluorinated polymer (I') is preferably a fluorinated polymer having groups convertible to sulfonic acid functional groups, more preferably a copolymer (hereinafter referred to also as fluorinated polymer (S')) of a fluoroolefin and a fluorine-containing monomer having a group convertible to a sulfonic acid functional group (hereinafter referred to also as fluorine-containing monomer (S')). Next, the fluorinated polymer (S') will be described.

The copolymerization for production of the fluorinated polymer (S') may be carried out by any known technique such as solution polymerization, suspension polymerization or emulsion polymerization The fluoroolefin may be any of those mentioned previously and is preferably TFE in view of the production cost of the monomer, the reactivity with other monomers and the ability to give an excellent fluorinated polymer (S).

The fluoroolefin may be a single species or a combination of two or more species.

The fluorine-containing monomer (S') may be a compound having at least one fluorine atom in the molecule, and having an ethylenic double bond and a group convertible to a sulfonic functional group.

The fluorine-containing monomer (S') is preferably a compound represented by the formula (2) in view of the production cost of the monomer, the reactivity with other monomers and the ability to give an excellent fluorinated polymer (S).

$$CF_2=CF-L-(A)n \quad \text{Formula (2)}$$

L and n in the formula (2) are the same as defined above.

A is a group convertible to a sulfonic acid functional group. The group convertible to a sulfonic acid functional group is preferably a functional group convertible to a sulfonic acid functional group by hydrolysis. Specific examples of the group convertible to a sulfonic acid functional group include $-SO_2F$, $-SO_2Cl$ and $-SO_2Br$.

The compound represented by the formula (2) is preferably a compound represented by the formula (2-1), a compound represented by the formula (2-2) or a compound represented by the formula (2-3).

$$CF_2=CF-O-R^{f1}-A \quad \text{Formula (2-1)}$$

$$CF_2=CF-R^{f1}-A \quad \text{Formula (2-2)}$$

Formula (2-3)

$R^{f1}$, $R^{f2}$, r and A in the formulae are the same as defined above.

The compound represented by the formula (2) is more preferably a compound represented by the formula (2-4).

$$CF_2=CF-(CF_2)_x-(O-CF_2CFY)_y-O-(CF_2)_z-SO_3M \quad \text{Formula (2-4)}$$

M, x, y, z and Y in the formula are the same as defined above.

Specific examples of the compound represented by the formula (2-1) include the following compounds wherein w is an integer of from 1 to 8, and x is an integer of from 1 to 5.

$$CF_2=CF-O-(CF_2)_w-SO_2F$$

$$CF_2=CF-O-CF_2CF(CF_3)-O-(CF_2)_w-SO_2F$$

$$CF_2=CF-[O-CF_2CF(CF_3)]_x-SO_2F$$

Specific examples of the compound represented by the formula (2-2) include the following compounds wherein w is an integer of from 1 to 8.

$$CF_2=CF-(CF_2)_w-SO_2F$$

$$CF_2=CF-CF_2-O-(CF_2)_w-SO_2F$$

The compound represented by the formula (2-3) is preferably a compound represented by the formula (2-3-1).

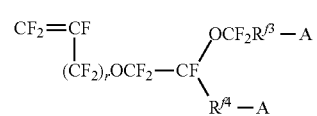
Formula (2-3-1)

$R^{f3}$, $R^{f4}$, r and A in the formula are the same as defined above.

Specific examples of the compound represented by the formula (2-3-1) include the following compounds:

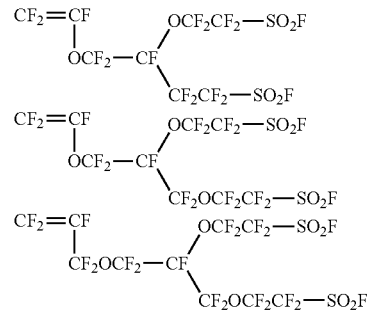

The fluorine-containing monomer (S') may be a single species or a combination of two or more species.

For production of the fluorinated polymer (S'), in addition to the fluoroolefin and the fluorine-containing monomer (S'), an additional monomer may be used. The additional monomer may be any of those mentioned previously.

The ion exchange capacity of the fluorinated polymer (I') can be adjusted by changing the content of groups convertible to ion exchange groups in the fluorinated polymer (I').

The precursor membrane may be formed, for example, by extrusion, specifically speaking, by forming membranes (I') made of a fluorinated polymer (I'), and then laminating a membrane (I'), a woven fabric and a membrane (I') in this order by laminating rolls or by a vacuum lamination apparatus.

The conversion of groups convertible to ion exchange groups in the precursor membrane to ion exchange groups may be carried out, for example, by hydrolyzing the precursor membrane or converting the precursor membrane to the acid form.

In particular, it is preferred to contact the precursor membrane with an aqueous alkaline solution.

Contact of the precursor membrane with an aqueous alkaline solution may be made, for example, by immersing the precursor membrane in the aqueous alkaline solution or by spraying the aqueous alkaline solution onto the surface of the precursor membrane.

The temperature of the aqueous alkaline solution is preferably from 30 to 100° C., more preferably from 40 to 100° C. The duration of the contact between the precursor membrane and the aqueous alkaline solution is preferably from 3 to 100 minutes, preferably from 5 to 50 minutes.

The aqueous alkaline solution preferably comprises an alkali metal hydroxide, a water-miscible organic solvent and water.

Specific examples of the alkali metal hydroxide are sodium hydroxide and potassium hydroxide.

Herein, the water-miscible organic solvent is an organic solvent which easily dissolves in water, and specifically, preferred is an organic solvent with a solubility of at least 0.1 g in 1,000 ml of water (20° C.), and more preferred is an organic solvent with a solubility of at least 0.5 g. The water-miscible organic solvent preferably contains at least one member selected from the group consisting of aprotic organic solvents, alcohols and amino alcohols, and more preferably contains an aprotic organic solvent.

The water-miscible organic solvent may be a single species or a combination of two or more species.

Specific examples of the aprotic organic solvents include dimethyl sulfoxide, N,N-dimethylformamide, N,N-dimethylacetamide, N-methyl-2-pyrrolidone and N-ethyl-2-pyrrolidone, and dimethyl sulfoxide is preferred.

Specific examples of the alcohols include methanol, ethanol, isopropanol, butanol, methoxyethoxyethanol, butoxyethanol, butyl carbitol, hexyloxyethanol, octanol, 1-methoxy-2-propanol and ethylene glycol.

Specific examples of the amino alcohols include ethanolamine, N-methylethanolamine, N-ethylethanolamine, 1-amino-2-propanol, 1-amino-3-propanol, 2-aminoethoxyethanol, 2-aminothioethoxyethanol and 2-amino-2-methyl-1-propanol.

The concentration of the alkali metal hydroxide in the aqueous alkaline solution is preferably from 1 to 60 mas %, more preferably from 3 to 55 mass %.

The content of the water-miscible organic solvent in the aqueous alkaline solution is preferably from 1 to 60 mas %, more preferably from 3 to 55 mass %. The content of water in the aqueous alkaline solution is preferably from 39 to 80 mass %.

After the contact of the precursor membrane with an aqueous alkaline solution, the aqueous alkaline solution may be removed. The aqueous alkaline solution may be removed, for example, by washing the precursor membrane which have been contacted with the aqueous alkaline solution with water.

After the contact of the precursor membrane with an aqueous alkaline solution, the resulting membrane may be brought in contact with an aqueous acidic solution to convert the ion exchange groups to the acid form.

Contact of the precursor membrane with an aqueous acidic solution may be made, for example, by immersing the precursor membrane in the an aqueous acidic solution or by spraying the an aqueous acidic solution onto the surface of the precursor membrane.

The aqueous acidic solution preferably comprises an acid component and water. As the acid component in the aqueous acidic solution, sulfuric aid or hydrochloric acid may, for example, be mentioned.

[Applications]

The polymer electrolyte membrane of the present invention is suitable for various applications and is especially suitable for water electrolysis.

The polymer electrolyte membrane of the present invention may be used for other applications, as a polymer electrolyte membrane in production of hydrogen peroxide, as a polymer electrolyte membrane in production of ozone, as a proton-selective membrane for waste acid recovery, as an ion exchange membrane for alkali chloride electrolysis, as a diaphragm for a redox flow battery, as a cation exchange membrane for desalting or salt production by electrodialysis, for TMAH production by electrolysis and for production of persulfates.

The polymer electrolyte membrane of the present invention is preferably used in the form of a membrane/electrode assembly.

Figure 2:
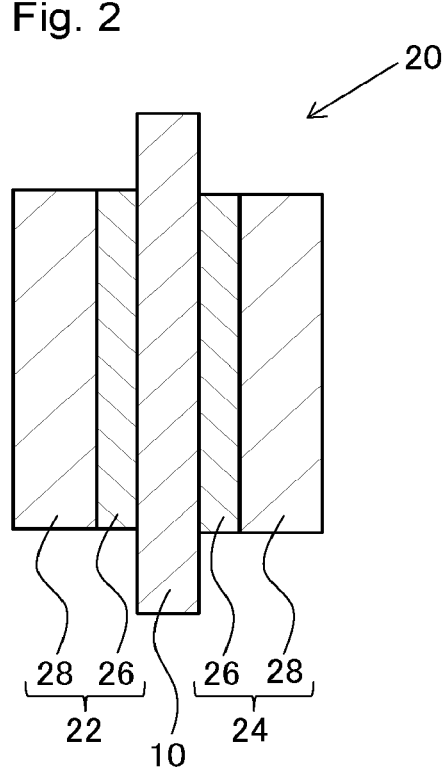
FIG. 2 A schematic sectional view of an embodiment of the membrane electrode assembly of the present invention.

FIG. 2 is a schematic sectional view of an embodiment of the polymer electrolyte membrane of the present invention. The membrane/electrode assembly 20 comprises an anode 22 having a catalyst layer 26 and a gas diffusion layer 28, a cathode 24 having a catalyst layer 26 and a gas diffusion layer 28, and a polymer electrolyte membrane 10 so disposed between the anode 22 and the cathode 24 as to be in contact with the catalyst layers 26.

The polymer electrolyte membrane is already described above.

The catalyst layers are layers containing a catalyst and a polymer having ion exchange groups.

As the catalyst, a platinum- or platinum alloy-loaded carbon catalyst may be mentioned. As the carbon support, carbon black powder may be mentioned.

As the polymer having ion exchange groups, a fluorinated polymer having ion exchange groups may be mentioned.

The gas diffusion layer serves to uniformly diffuse a gas into the catalyst layer and also serves as a current collector. As the gas diffusion layer, carbon paper, carbon cloth, carbon felt, etc. may be mentioned. The gas diffusion layer is preferably one treated for water repellency with e.g. polytetrafluoroethylene.

The membrane/electrode assembly may be produced, for example, by forming catalyst layers on a polymer electrolyte membrane and sandwiching the resulting membrane/catalyst layer assembly between gas diffusion layers, or by forming catalyst layers on gas diffusion layers to form electrodes (anode and cathode) and then sandwiching a polymer electrolyte membrane by the electrodes.

The catalyst layers may be formed by applying a catalyst layer-forming coating liquid to predetermined areas and drying the coating liquid. The catalyst layer-forming coating liquid is a dispersion of the polymer having ion exchange groups and the catalyst in a dispersion medium.

Though the membrane/electrode assembly shown in FIG. 2 contains gas diffusion layers, gas diffusion layers are optional and may be omitted from a membrane/electrode assembly.

The water electrolyzer of the present invention comprises the above-mentioned polymer electrolyte membrane or the above-mentioned membrane/electrode assembly. Because the polymer electrolyte membrane of the present invention is strong, the water electrolyzer of the present invention is durable. The water electrolyzer of the present invention is operable at a low electrolysis voltage.

EXAMPLES

Now, the present invention will be described in detail with reference to Examples, but the present invention is not limited by these Examples.

[Thickness of Polymer Electrolyte Membrane]

The thickness of a polymer electrolyte membrane was determined by analyzing cross sectional image of the ion exchange membrane under an optical microscope by image analysis software, after 2 hours of drying at 90° C.

[Ion Exchange Capacity of Fluorinated Polymer]

The weight of a fluorinated polymer was measured after 24 hours of incubation in a glove box purged with dry nitrogen, as the dry mass of the fluorinated polymer. Then, the fluorinated polymer was soaked in 2 mol/L aqueous sodium chloride at 60° C. for 1 hour. The fluorinated polymer was recovered and washed with ultrapure water, and the solution in which the fluorinated polymer had been soaked was titrated with 0.1 mol/L aqueous sodium hydroxide. The ion exchange capacity of the fluorinated polymer was obtained by dividing the titration value by the dry mass of the resin used.

[Weight of Woven Fabric]

A 20 cm×20 cm square was cut from a roll of a woven fabric to be used and weighed in quintuplicate. The five measurements were averaged to obtain the weight (g/m$^2$) of the fabric.

[Burst Test]

Burst tests were conducted on polymer electrolyte membranes obtained as described later in accordance with ISO 3303-2 in quintuplicate. The average of five measurements was rated as x when it was 50 kPa or below, as Δ when it was more than 50 kPa and at most 100 kPa, as ○ when it was more than 100 kPa and at most 150 kPa, and as ⊚ when it was more than 150 kPa.

[Evaluation of Water Electrolysis Performance]

TFE and a monomer (X), which will be described later, were copolymerized, and the resulting polymer was hydrolyzed and converted to the acid form by acid treatment. The resulting polymer (ion exchange capacity: 1.10 meq/g dry resin) was dispersed in a solvent mixture of water/ethanol=40/60 (mass %) to obtain a dispersion (hereinafter referred to also as dispersion X) having a solid content of 25.8%. To the dispersion X (19.0 g), ethanol (0.52 g) and water (3.34 g) were added, and then an iridium oxide catalyst (13.0 g) (manufactured by Tanaka Kikinzoku Kogyo K. K.) containing 76 mass % iridium and having a specific surface area of 100 cm$^2$/g was added. The resulting mixture was ground in a planetary ball mill (rotation speed 200 rpm) for 600 minutes to obtain an anode catalyst ink having a solid content of 40 mass %.

The anode catalyst ink was applied with a bar coater onto a EPTFE sheet at 1.5 mg/cm$^2$, dried at 80° C. for 10 minutes and heated at 150° C. for 15 minutes to obtain an anode catalyst layer decal.

To a platinum-loaded carbon powder catalyst (11 g) (manufactured by Tanaka Kikinzoku Kogyo K. K., "TEC10E50E") with a platinum loading of 46 mass %, water (59.4 g) and ethanol (39.6 g) were added, and the mixture was pulverized with an ultrasonic homogenizer to obtain a catalyst dispersion.

To the catalyst dispersion, a liquid mixture preliminarily prepared by kneading the dispersion X (20.1 g), ethanol (11 g) and ZEORORA-H (6.3 g) (manufactured by Zeon Corporation) was added. The resulting dispersion was mixed with water (3.66 g) and ethanol (7.63 g) in a paint conditioner for 60 minutes to obtain a cathode catalyst ink having a solid content of 10.0 mass %.

The cathode catalyst ink was applied onto a ETFE sheet with a die coater, dried at 80° C. and then heated at 150° C. for 15 minutes to obtain a cathode catalyst layer decal containing platinum at 0.4 mg/cm$^2$.

One surface of a polymer electrolyte membrane obtained as described later was brought into contact with the catalyst layer of the anode catalyst layer decal, and the other surface of the polymer electrolyte membrane was brought into contact with the catalyst layer of the cathode catalyst layer decal, and the polymer electrolyte membrane with the anode catalyst layer was bonded to the cathode catalyst layer by hot press at a pressing temperature of 150° C. for a pressing time of 10 minutes under a pressure of 3 MPa. When the temperature dropped to 70° C., the pressure was released, and the resulting laminate was taken out, and the ETFE sheets in the anode catalyst layer decal and the cathode catalyst layer decal were peeled off to obtain a membrane/electrode assembly having an electrode area of 16 cm$^2$.

The membrane/electrode assembly obtained as described above was set in a water electrolyzer test hardware EH50-25 (manufactured by Greenlight Innovation).

Then, pure water at 80° C. with an electrical conductivity of at most 1.0 μS/cm was supplied to both the anode and cathode compartments to fully hydrate the polymer electrolyte membrane and the ionomers in the electrodes at a flow rate of 50 mL/min for 12 hours, and then the cathode compartment was purged with nitrogen.

After the purging with nitrogen, pure water at 80° C. with an electrical conductivity of at most 1.0 μS/cm was supplied to the anode compartment at a flow rate of 50 mL/min, and with the gas output pressure of 100 kPaG at the cathode and the gas output gas output of 100 kPaG at the anode, the electric current from a DC power source HCP-803 manufactured by Bio-Logic was increased stepwise in increments of 2.5 A from 0 to 32 A (current density from 0 to 2 A/cm$^2$) at intervals of 5 minutes. The electrolysis voltage at a current of 32 A (current density of 2 A/cm$^2$) was rated on the following scale.

⊚: less than 1.9 V
○: at least 1.9 V and less than 2.3 V
Δ: at least 2.3 V and less than 2.5 V
X: at least 2.5 V

[Preparation of Fluorinated Polymer (S'-1)]

$CF_2=CF_2$ and a monomer (X) represented by the following formula (X) were copolymerized to obtain fluorinated polymer (S'-1) (ion exchange capacity: 1.00 meq/g dry resin).

$$CF_2=CF-O-CF_2CF(CF_3)-O-CF_2CF_2-SO_2F \quad (X)$$

[Preparation of Fluorinated Polymer (S'-2)]

$CF_2=CF_2$ and the monomer (X) were copolymerized to obtain fluorinated polymer (S'-2) (ion exchange capacity: 1.10 meq/g dry resin).

[Preparation of Fluorinated Polymer (S'-3)]

$CF_2=CF_2$ and the monomer (X) were copolymerized to obtain fluorinated polymer (S'-3) (ion exchange capacity: 1.25 meq/g dry resin).

[Preparation of Fluorinated Polymer (S'-4)]

$CF_2=CF_2$ and the above-mentioned monomer (X) were copolymerized to obtain fluorinated polymer (S'-4) (ion exchange capacity: 0.91 meq/g dry resin).

[Preparation of Fluorinated Polymer (S'-5)]

$CF_2=CF_2$ and a monomer (Y) were copolymerized to obtain fluorinated polymer (S'-5) (ion exchange capacity: 1.90 meq/g dry resin).

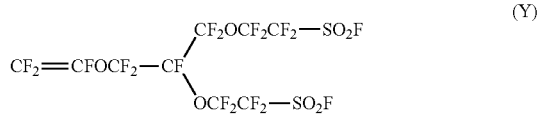

(Y)

The ion exchange capacities mentioned above in [Preparation of fluorinated polymer (S'-1)] to [Preparation of fluorinated polymer (S'-5)] are ion exchange capacities of the fluorinated polymers obtained by hydrolyzing fluorinated polymers (S'-1) to (S'-5) as described later.

[Production of Film α1]

Fluorinated polymer (S'-1) was melt-extruded to obtain film α1 made of fluorinated polymer (S'-1) (thickness: 115 μm).

[Production of Film β2]

Fluorinated polymer (S'-2) was melt-extruded to obtain film β2 1 made of fluorinated polymer (S'-2) (thickness: 90 μm).

[Production of Film γ2]

Fluorinated polymer (S'-3) was melt-extruded to obtain film γ2 made of fluorinated polymer (S'-3) (thickness: 90 μm).

[Production of Film γ3]

Fluorinated polymer (S'-3) was melt-extruded to obtain film γ3 made of fluorinated polymer (S'-3) (thickness: 60 μm).

[Production of Film δ4]

Fluorinated polymer (S'-4) was melt-extruded to obtain film δ4 made of fluorinated polymer (S'-4) (thickness: 20 μm).

[Production of Film ε2]

Fluorinated polymer (S'-5) was melt-extruded to obtain film ε2 made of fluorinated polymer (S'-5) (thickness: 90 μm).

[Production of Film ε5]

Fluorinated polymer (S'-5) was melt-extruded to obtain film ε5 made of fluorinated polymer (S'-5) (thickness: 200 μm).

[Production of Woven Fabric 1]

50-denier PTFE slit yarns were woven as the warp and weft at a density of 80 threads/in. into a plain weave with a weight of 38 g/m², which is designated as woven fabric 1.

[Production of Woven Fabric 2]

400-denier PTFE threads were woven as the warp and weft at a density of 50 threads/in. into a plain weave with a weight of 188 g/m², which is designated as woven fabric 2.

[Production of Woven Fabric 3]

10-denier PTFE threads were woven as the warp and weft at a density of 30 threads/in. into a plain weave with a weight of 3 g/m², which is designated as woven fabric 3.

Example 1

A stack of PET film/film α1/woven fabric 1/film α1/PET film was hot-pressed in a flat press at 200° C. under a contact pressure of 30 MPa/m², and the PET films as the transfer substrates were peeled from both sides to obtain a precursor membrane.

The precursor membrane was soaked in a liquid mixture of dimethyl sulfoxide/potassium oxide/water=30/5.5/64.5 (mass ratio) at 95° C. for 30 minutes to hydrolyze the groups convertible to sulfonic acid functional groups in the precursor membrane to potassium sulfonate functional groups, and then the membrane was washed with water. Then, the membrane was soaked in 1 M sulfuric acid to convert the terminal potassium sulfonate groups to sulfonic acid groups, and dried to obtain a polymer electrolyte membrane with a thickness of 230 μm. A burst test and evaluation of water electrolysis performance were conducted as described above using the polymer electrolyte membrane. The results are shown in Table 1.

Example 2

A polymer electrolyte membrane was prepared in the same manner as in Example 1 except that film β2 was used instead of film α1, and tests were conducted.

Example 3

A polymer electrolyte membrane was prepared in the same manner as in Example 1 except that film γ2 was used instead of film α1, and tests were conducted.

Example 4

A polymer electrolyte membrane was prepared in the same manner as in Example 1 except that film ε2 was used instead of film α1, and tests were conducted.

Example 5

A polymer electrolyte membrane was prepared in the same manner as in Example 1 except that film δ4 was used instead of film α1, and tests were conducted.

Example 6

A polymer electrolyte membrane was prepared in the same manner as in Example 1 except that film ⊖5 was used instead of film α1, and tests were conducted.

Comparative Example 1

A polymer electrolyte membrane was prepared in the same manner as in Example 1 except that film γ3 was used instead of film α1, and woven fabric 2 was used instead of woven fabric 1, and tests were conducted.

Comparative Example 2

A polymer electrolyte membrane was prepared in the same manner as in Comparative Example 1 except that woven fabric 3 was used instead of woven fabric 2, and tests were conducted.

Comparative Example 3

A polymer electrolyte membrane was prepared in the same manner as in Comparative Example 1 except that woven fabric 2 was not used, and tests were conducted.

"AR (meq/g dry resin)" in Table 1, means the ion exchange capacity of the fluorinated polymer in the polymer electrolyte membrane. "Thickness (μm)" in Table 1 means the thickness of the polymer electrolyte membrane. "Denier (g/9000 m)" in Tale 1 means the denier count of the warp and the weft of the woven fabric.

TABLE 1

| Table 1 | Monomer species | AR (meq/g dry resin) | Thickness (μm) | Woven fabric species | Weight (g/cm$^2$) | Denier (g/9000 m) | Density (threads/in.) | Evaluation Bursting strength | Water electrolysis performance |
|---|---|---|---|---|---|---|---|---|---|
| Ex. 1 | TFE/monomer (X) | 1.00 | 230 | Woven fabric 1 | 38 | 50 | 80 | ◉ | ○ |
| Ex. 2 | TFE/monomer (X) | 1.10 | 180 | Woven fabric 1 | 38 | 50 | 80 | ◉ | ○ |
| Ex. 3 | TFE/monomer (X) | 1.25 | 180 | Woven fabric 1 | 38 | 50 | 80 | ○ | ◉ |
| Ex. 4 | TFE/monomer (Y) | 1.90 | 180 | Woven fabric 1 | 38 | 50 | 80 | ○ | ◉ |
| Ex. 5 | TFE/monomer (X) | 0.91 | 40 | Woven fabric 1 | 38 | 50 | 80 | ○ | Δ |
| Ex. 6 | TFE/monomer (X) | 1.90 | 400 | Woven fabric 1 | 38 | 50 | 80 | ○ | Δ |
| Com. Ex. 1 | TFE/monomer (X) | 1.25 | 120 | Woven fabric 2 | 188 | 400 | 50 | ◉ | × |
| Com. Ex. 2 | TFE/monomer (X) | 1.25 | 120 | Woven fabric 3 | 3 | 10 | 30 | × | ◉ |
| Com. Ex. 3 | TFE/monomer (X) | 1.25 | 120 | — | — | — | — | × | ◉ |

The results are shown in Table 1. As the Table shows, the polymer electrolyte membranes of Examples 1 to 6 according to the present invention not only had sufficient bursting strength, or mechanical strength to withstand differential pressure, as compared to those of Comparative Examples 1 to 3, and enabled water electrolysis at low electrolysis voltage.

This application is a continuation of PCT Application No. PCT/JP2018/041164 filed on Nov. 6, 2018, which is based upon and claims the benefit of priority from Japanese Patent Application No. 2017-213865 filed on Nov. 6, 2017. The contents of those applications are incorporated herein by reference in their entireties.

EXPLANATION OF REFERENCE SYMBOLS

10: polymer electrolyte membrane, 12: electrolyte, 14; woven fabric, 20: membrane/electrode assembly, 22: anode, 24: cathode, 26: catalyst, 28: gas diffusion layer

What is claimed is:

1. A polymer electrolyte membrane comprising:
   a fluorinated polymer and a woven fabric, wherein the weight of the woven fabric is from 20 to 95 g/m$^2$,
   the warp and weft of the woven fabric independently have a denier of from 30 to 100, and
   the warp density and the weft density of the woven fabric are independently at least 80 threads per inch and at most 100 threads per inch.

2. The polymer electrolyte membrane according to claim 1, wherein the ion exchange capacity of the fluorinated polymer is from 1.00 to 2.00 meq/g dry resin.

3. The polymer electrolyte membrane according to claim 1, wherein the woven fabric is a plain weave.

4. The polymer electrolyte membrane according to claim 1, which is from 30 to 500 μm in thickness.

5. The polymer electrolyte membrane according to claim 1, wherein the warp and weft are made of a material selected from the group consisting of polytetrafluoroethylene, polyether ether ketone and polyphenylene sulfide.

6. The polymer electrolyte membrane according to claim 5, wherein the warp and the weft are slit yarns.

7. The polymer electrolyte membrane according to claim 1, wherein the ion exchange groups are sulfonic acid functional groups.

8. The polymer electrolyte membrane according to claim 1, wherein the fluorinated polymer comprises units based on a fluoroolefin and units based on a monomer having a sulfonic acid functional group and a fluorine atom.

9. The polymer electrolyte membrane according to claim 8, wherein the units based on a fluoroolefin are units based on tetrafluoroethylene.

10. The polymer electrolyte membrane according to claim 8, wherein the units based on a monomer having a sulfonic acid functional group and a fluorine atom are units represented by the formula (1):

$$-[CF_2-CF(-L-(SO_3M)_n)]- \qquad \text{Formula (1)}$$

wherein L is a (n+1)-valent perfluorinated hydrocarbon group which may contain an oxygen atom, M is a hydrogen atom, an alkali metal or a quaternary ammonium cation, and n is 1 or 2.

11. The polymer electrolyte membrane according to claim 10, wherein the units represented by the formula (1) are units represented by the formula (1-3):

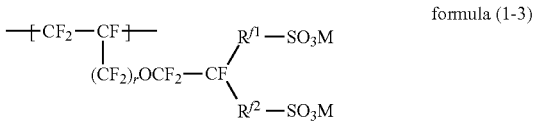

formula (1-3)

wherein M is a hydrogen atom, an alkali metal or a quaternary ammonium cation, $R^{f1}$ is a perfluoroalkylene group which may contain an oxygen atom between carbon atoms, $R^{f2}$ is a single bond or a perfluoroalkylene group which may contain an oxygen atom between carbon atoms, and r is an integer of 0 or 1.

12. The polymer electrolyte membrane according to claim 10, wherein the units represented by the formula (1) are units represented by the formula (1-4):

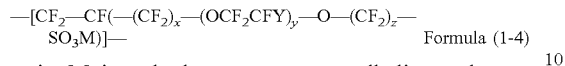
$$\text{Formula (1-4)}$$

wherein M is a hydrogen atom, an alkali metal or a quaternary ammonium cation, x is 0 or 1, y is an integer of from 0 to 2, z is an integer of from 1 to 4, and Y is F or $CF_3$.

13. A membrane/electrode assembly comprising an anode having a catalyst layer, a cathode having a catalyst layer, and the polymer electrolyte membrane as defined in claim 1 disposed between the anode and the cathode.

14. A water electrolyzer comprising the polymer electrolyte membrane as defined in claim 1.

15. A water electrolyzer comprising the membrane/electrode assembly as defined in claim 14.

16. The polymer electrolyte membrane according to claim 8, wherein the units based on a monomer having a sulfonic acid functional group and a fluorine atom are units represented by formula (2):

$$\text{Formula (2)}$$

wherein L is a (n+1)-valent perfluorinated hydrocarbon group which may contain an oxygen atom, n is 1 or 2, and A is a group convertible to a sulfonic acid functional group.

* * * * *